Figure 1:
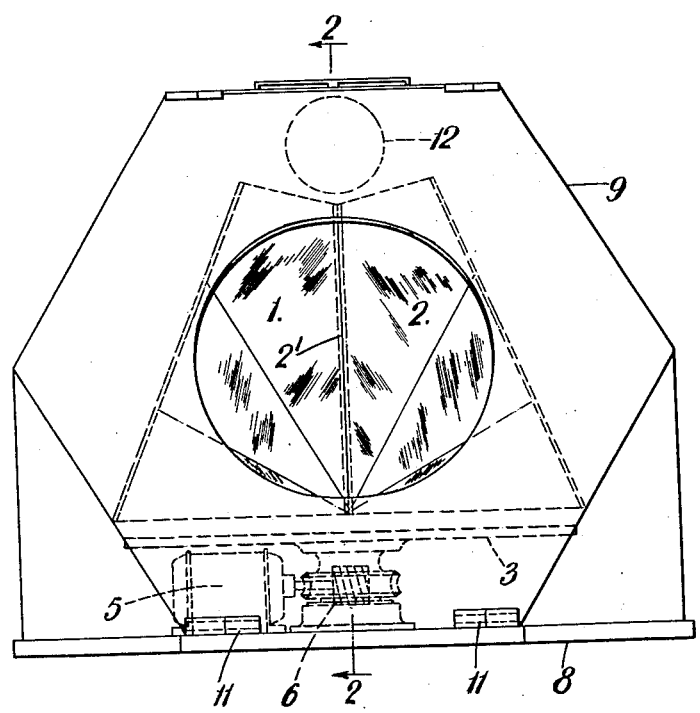

July 31, 1934.  S. C. GILL ET AL  1,968,759
DISPLAY DEVICE
Filed June 11, 1932  2 Sheets-Sheet 1

Inventors:
Sydney Charles Gill.
Sydney Dallaway.
by
W. H. Blake
Attorney.

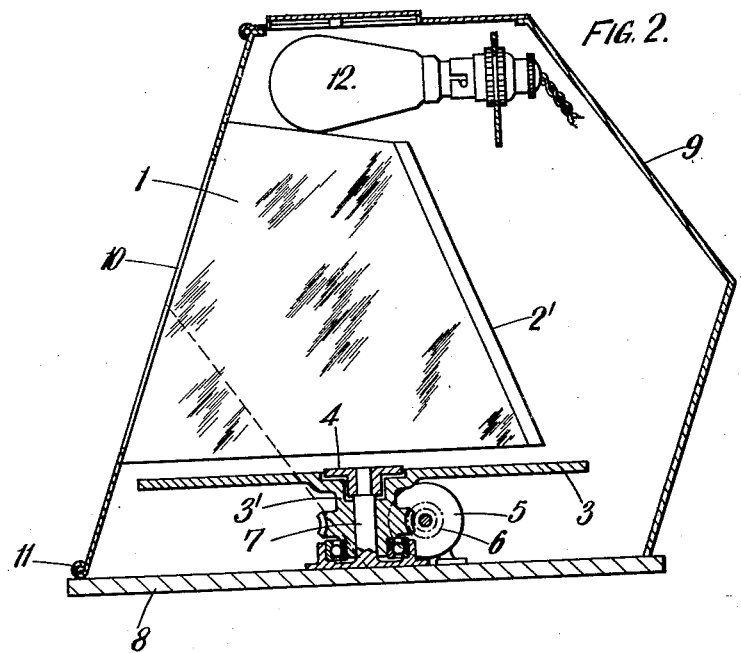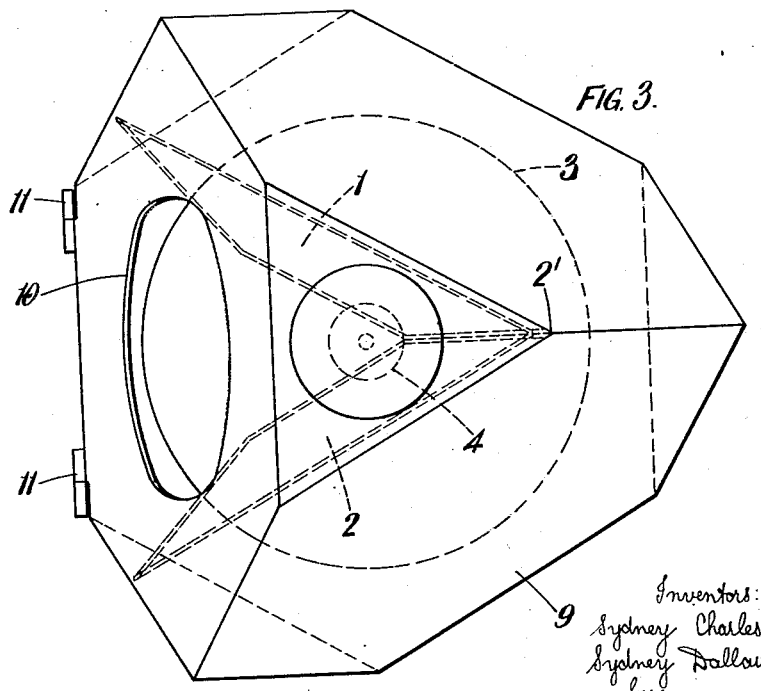

Patented July 31, 1934

1,968,759

UNITED STATES PATENT OFFICE 1,968,759

DISPLAY DEVICE

Sydney Charles Gill and Sydney Dallaway, London, England

Application June 11, 1932, Serial No. 616,727
In Great Britain February 20, 1932

1 Claim. (Cl. 88—15)

This invention relates to an improved display device and has for its object to produce such an apparatus as shall compellingly attract attention and present an artistic and attractive appearance. A further object being to produce a device so constructed that it may easily be dismantled or folded for transport.

According to the present invention a moving display member is so arranged with relation to a kaleidoscopic mirror assembly that a moving kaleidoscopic view is obtained. The invention also includes a kaleidoscopic mirror assembly consisting of at least two mirror surfaces in inclined "pent-house" relation, having their joining line inclined from the vertical towards an observer.

The invention will now be described by way of example only with reference to the accompanying drawings, in which:—

Figures 1, 2 and 3 represent respectively a front, a sectional side elevation and a plan view of a publicity display device according to the invention, having a motor driven turntable.

Referring now to these figures, two kaleidoscopic mirrors 1 and 2 are secured together along one edge 2' whilst their other edges are secured to a casing 9. Underneath the mirrors is provided an annular turntable 3, at the centre of which is a stationary display platform 4. The turntable 3 is driven by an electric motor 5 connected by worm gearing 6 to the hub 3' of the turntable 3. The hub 3' is rotatably mounted on a fixed upright shaft 7 which supports the stationary platform 4. The turntable may, however, be driven in any other suitable manner, as for example, by a clockwork motor, convection motor or the like. The turntable 3 may be formed as, or provided with a tray in which articles for display may be placed, a suitable background being formed of coloured paper.

The whole assembly is mounted upon a base 8 to which the casing 9 is connected at the front by hinges 11. The front of the casing 9 is provided with a viewing aperture 10. An electric lamp 12, mounted inside the top of the casing, illuminates the front of the turntable 3 and the platform 4.

The mirrors may be constructed of polished metal, suitably hinged one to another and provided with securing means, such as, friction pins, adapted to push into plugs in a framework supporting the turntable, to which framework the containing cabinet is attached.

If a small object, such as, a jar of face cream, is placed upon the platform 4 and various pieces of coloured paper, tinsel or the like are placed upon the turntable 3, then on rotation of the latter, the object will be seen through the viewing aperture brilliantly illuminated and surrounded by constantly changing symmetrical patterns due to the kaleidoscopic action of the mirror assembly.

What we claim is:—

A display device comprising a casing having a front wall with an aperture therein, a kaleidoscopic mirror assembly mounted on said front wall, an electric lamp located above said mirror assembly, a spindle mounted in the bottom of said casing, a stationary platform carried by said spindle, a rotary platform rotatably mounted on said spindle, said platforms being arranged concentrically below said mirror assembly, and means for rotating the rotatable platform.

SYDNEY CHARLES GILL.
SYDNEY DALLAWAY.